(12) United States Patent
Hofbauer

(10) Patent No.: US 10,554,023 B2
(45) Date of Patent: Feb. 4, 2020

(54) MOUNTING AND LATCHING MECHANISM FOR STANDARD RAILS

(75) Inventor: Edwin Hofbauer, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 97 days.

(21) Appl. No.: 13/514,877

(22) PCT Filed: Nov. 22, 2010

(86) PCT No.: PCT/EP2010/067885
§ 371 (c)(1),
(2), (4) Date: Aug. 10, 2012

(87) PCT Pub. No.: WO2011/069810
PCT Pub. Date: Jun. 16, 2011

(65) Prior Publication Data
US 2012/0298821 A1    Nov. 29, 2012

(30) Foreign Application Priority Data

Dec. 10, 2009  (AT) .................................... 1950/09

(51) Int. Cl.
*H02B 1/052* (2006.01)
*H01R 9/26* (2006.01)

(52) U.S. Cl.
CPC ........... *H02B 1/052* (2013.01); *H01R 9/2608* (2013.01)

(58) Field of Classification Search
CPC ........ H01R 9/26; H01R 9/2608; H02B 1/052; H02B 1/0523; H02B 1/0526; B25B 1/02; B25B 1/24
USPC ............... 439/532, 716; 248/220.21, 220.22, 248/222.11, 222.12, 228.4–228.6, 228.3, 248/229.12, 229.22, 230.3, 231.41, 316.4; 403/325, 327, 374.5; 361/679.58, 361/679.31–679.39, 809, 732, 733, 361/724–727, 752; 269/43
See application file for complete search history.

(56) References Cited

U.S. PATENT DOCUMENTS

| | | | |
|---|---|---|---|
| 4,067,529 A | | 1/1978 | Milcoy |
| 4,921,445 A | * | 5/1990 | Herbert .......................... 439/532 |
| 5,904,592 A | * | 5/1999 | Baran et al. ................... 439/532 |
| 6,120,000 A | * | 9/2000 | Aeschbach et al. .......... 248/694 |

(Continued)

FOREIGN PATENT DOCUMENTS

| | | |
|---|---|---|
| CN | 1287701 | 3/2001 |
| CN | 101553963 | 10/2009 |

(Continued)

OTHER PUBLICATIONS

Google Translations of Selected Portions of Siemens (DE 295 06 579 U1).*

*Primary Examiner* — Jonathan Liu
*Assistant Examiner* — Guang H Guan
(74) *Attorney, Agent, or Firm* — Cozen O'Connor

(57) ABSTRACT

A mounting and latching mechanism of an electrical device for fastening to a standard rail, to an immovable claw, and to a claw that is movable via a spring force, wherein the movable claw can be translationally moved relative to the immovable claw and wherein the immovable claw and the movable claw are formed as one piece having a connecting spring structure. A one-piece design is possible because of the translational mobility, which provides for cheap and simple production.

10 Claims, 1 Drawing Sheet

(56) References Cited

U.S. PATENT DOCUMENTS

| | | | |
|---|---|---|---|
| 6,292,076 B1* | 9/2001 | DeGrazia et al. | 335/202 |
| 6,563,697 B1 | 5/2003 | Simbeck et al. | |
| 7,073,971 B2* | 7/2006 | Schurr et al. | 403/325 |
| 7,952,859 B2* | 5/2011 | Peng | 361/679.02 |
| 9,088,138 B2* | 7/2015 | Yu | H02B 1/0526 |
| 9,485,879 B2* | 11/2016 | Molnar | H05K 5/0026 |
| 10,340,668 B2* | 7/2019 | Siehler | H01R 9/2608 |
| 2005/0006053 A1* | 1/2005 | Apfelbacher et al. | 165/80.2 |
| 2008/0186657 A1 | 8/2008 | Weber et al. | |
| 2012/0298821 A1* | 11/2012 | Hofbauer | H02B 1/052 248/231.41 |

FOREIGN PATENT DOCUMENTS

| | | | | |
|---|---|---|---|---|
| DE | 31 49 329 | | 6/1983 | |
| DE | 29506579 U1 * | | 6/1995 | H02B 1/052 |
| DE | 298 12 489 | | 10/1998 | |
| DE | 101 48 623 | | 4/2003 | |
| DE | 20 2004 019 381 U | | 2/2005 | |
| DE | 10 2004 062 524 | | 7/2006 | |
| DE | 10 2006 030 953 | | 3/2007 | |
| EP | 0 300 065 | | 1/1989 | |
| EP | 0 602 305 | | 6/1994 | |
| FR | 2030852 | | 11/1970 | |
| FR | 2 709 613 | | 3/1995 | |
| NL | 8304219 | | 7/1985 | |
| RU | 2 225 666 | | 3/2004 | |
| RU | 86 054 | | 8/2009 | |

* cited by examiner

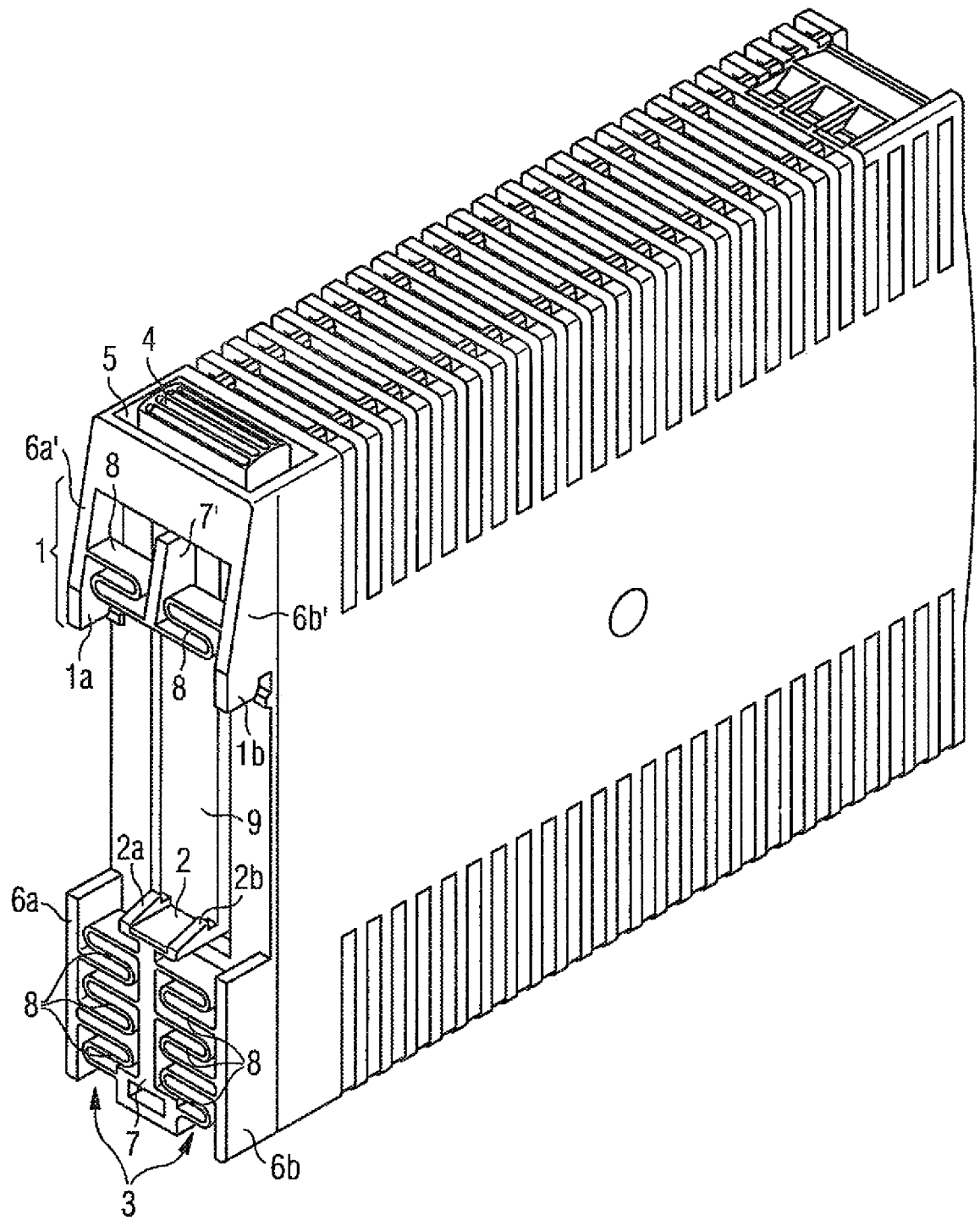

MOUNTING AND LATCHING MECHANISM FOR STANDARD RAILS

CROSS-REFERENCE TO RELATED APPLICATIONS

This is a U.S. national stage of application No. PCT/EP2010/067885 filed 22 Nov. 2010. Priority is claimed on Austrian Application No. A1950/2009 filed 10 Dec. 2009, the content of which is incorporated herein by reference in its entirety.

BACKGROUND OF THE INVENTION

1. Field of the Invention

The invention relates to a mounting and latching mechanism of an electrical or electronic device for fastening to a standard rail, to an immovable claw and to a claw which is movable against a spring force. A hook-type embodiment is referred to here as a claw.

2. Description of the Related Art

In switching cabinets or other electrical installation facilities, rails are usually provided as holders for various electrical or electronic devices. These rails comprise standardized cross-sectional dimensions and are therefore also referred to as standard rails. In this way, the standardized dimensions of a standard rail determine the connection types of the mounting and latching mechanism of a device, which are to be mountable on a standard rail.

Generally, a mounting and latching mechanism of this type generally includes an immoveable claw relative to the device, a device housing and a moveable claw and/or latch relative to the device and/or the device housing. Here, a short, rotatably mounted lever is referred to as a latch. The latching of the device is effected by the moveable claw and/or latch. With one device installation, the device is usually suspended on the top side of the standard rail with the upper claw. In the course of a downward pivoting movement, the latching consequently occurs by the moveable claw and/or latch hooking onto the lower side of the standard rail. The moveable claw and/or latch is pushed downwards in this way against a spring force until the final position is reached and the claw and/or latch snap into place as a result of the spring force. The lower rail edge is configured such that the moveable claw hooks thereto.

In order to release the thus fastened device, the moveable claw and/or latch must be unlocked. In the simplest case, this occurs by levering off by a suitable tool, e.g., a screw driver. Provided the moveable claw and/or latch comprises an appendage protruding from the housing, the unlocking occurs by pushing a finger onto this appendage.

In accordance with the prior art, the moveable claw is, for instance, used as a slider in a guidance on the rear side of the housing. A spring supported against the housing exerts a force on the slider.

SUMMARY OF THE INVENTION

It is an object of the invention to provide an improved mounting and latching mechanism of an electrical or electronic device for fastening to a standard rail.

This and other objects and advantages are achieved in accordance with the invention by an arrangement in which the moveable claw can be translationally moved relative to the immoveable claw. In addition, the immoveable claw and the moveable claw are formed in one piece with a connecting spring structure. A one-piece configuration is thus possible as a result of the translational moveability, which ensures a cost-effective and simple manufacture.

In a particularly favorable embodiment the immovable claw, the moveable claw and the connecting spring structure comprise elements of a plastic injection-molded part.

In an advantageous embodiment, provision is made for the immovable claw to include two hook-type appendages, which can be mounted in an upper edge of the standard rail and for the moveable claw to have at least one hook-type appendage, which can be latched to a lower edge of the standard rail. The device can therefore be connected to a standard rail at at least three points and is in this way clearly determined in terms of its position.

For simple unlocking, it is advantageous if the moveable claw is rigidly connected to an actuation element. Here, the actuation element is favorably guided in a guidance in parallel to the direction of motion of the moveable claw.

For a simple operation of the unlocking device, the actuation element is guided in the direction of the immoveable claw and in this way protrudes therebeyond. The operator element can therefore be operated on the side at which the immovable claw is located. This side is generally easily accessible because adequate space must be provided on this side during the device installation to pivot the device during the mounting and catching process.

In another advantageous embodiment, the connecting spring structure comprises a meander-type spring structure. Such a structure is simple to manufacture, in particular by a plastic injection molding method.

The advantageous embodiment is further developed by the immovable claw passing into at least one immoveable web and the moveable claw passing into at least one moveable web arranged adjacent to the immoveable web and by the moveable web being connected to the immoveable web by the meander-type spring structure. This arrangement effects a compact embodiment of the mounting and latching mechanism having a minimal part of its overall device depth. This is particularly the case if a moveable web is arranged centrally between two immoveable webs.

For a particularly precise guidance of the moveable parts, provision is made for the spring structure to include several meander-type spring elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained by way of example below with reference to the appended FIGURE, in which:

The FIGURE shows a schematic representation of an oblique view of a device having a mounting and latching mechanism on the device rear.

DETAILED DESCRIPTION OF THE PREFERRED EMBODIMENTS

In the FIGURE an electrical or electronic device is shown having a conventional, essentially square device housing.

The mounting and latching mechanism for fastening the device to a standard rail is depicted on the rear of the device housing.

The device is shown in the conventional installation position. The exemplary mechanism includes an immoveable claw 1, which can be mounted in the upper edge of a standard rail. In this way two appendages 1a, 1b are formed which, in a mounted state, engage behind the upper edge of a standard rail and hold the device in position.

In order to catch on a lower edge of a standard rail, a translationally moveable claw 2 is arranged relative to the immovable claw 1. This moveable claw 2 includes, for instance, two appendages 2a, 2b, which engage behind the lower edge of the standard rail in the case of a fastened device. The two claws 1, 2 therefore form elements of a bracket, with which the device can be mounted on the standard rail.

The immoveable claw 1 and the moveable claw 2 are connected by a spring structure 3, where these elements are manufactured in one piece in accordance with the invention. The spring structure 3 functions here on the one hand as a reset element, if the bracket formed with the claws 1, 2 is strut apart. On the other hand, the spring structure 3 advantageously fulfills a guiding function, by determining the degree of freedom of movement of the movable claw 2. Optionally, an additional guidance of the moveable claw 2 can be provided.

The spring structure 3 is favorably formed by, in the simplest case, several meander-type s-shaped elements 8. Each spring element 8 consists, for instance, of a strip having a rectangular cross-section, which comprises two opposite bends about the cross-sectional axis with the smallest resisting torque. Strip segments which are parallel to one another exist in the unloaded state at the ends and between the bends.

Here, each spring element 8 is connected to the moveable claw 2 with one end and to the immoveable claw 1 with the other end. For connection to the spring element 8, the claws 1, 2 pass into at least one web 6a, 6b, 6a', 6b' and/or 7, 7' in each instance.

In an advantageous embodiment, each appendage 1a, 1b of the immoveable claw 1 passes into a web 6a, 6b and/or 6a', 6b' in each instance. Here, each web 6a, 6b and/or 6a', 6b' extends over the height of the mounting and latching mechanism and is in this way split into two segments 6a, 6a' and/or 6b, 6b' by a recess for the standard rail.

A movable web 7, 7' is rigidly connected to the moveable claw 2 in parallel with these immoveable webs 6a, 6b, 6a', 6b'. This movable web 7, 7' proceeds centrally between the two immoveable webs 6a, 6b, 6a', 6b' and is likewise split into two further segments 7, 7' by the recess for standard rails. These two further segments 7, 7' are connected to one another by a planar rail 9.

In the embodiment shown, six spring elements 8 are arranged below the moveable claw 2. The moveable web 7 is connected here to the one immoveable web 6a by three spring elements 8 arranged one above the other and to the other immoveable web 6b by three spring elements 8 arranged one above the other.

Above the immoveable claw 1, the moveable web 7' is connected to the one immoveable web 6a' and the other immoveable web 6b' with a spring element 8, in each instance.

The planar rail 9, which connects the two further segments 7, 7' of the moveable web is extended in the embodiment shown to an actuation element 4. This actuation element 4 is guided in a guidance 5 connecting to the immoveable claw 1 and protrudes beyond the upper edge of the device housing. As a result, simple accessibility to the actuation element 4 is provided.

To ensure an even hold of the device on a standard rail, the mounting and latching mechanism is favorably structured in symmetry with the main central plane of the device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mounting and latching mechanism of an electrical device for fastening on a standard rail, the mounting and latching mechanism comprising:
   at least one moveable web including a first moveable web;
   an immoveable claw;
   a moveable claw which is moveable against a spring force; and
   an externally disposed moveable planar rail arranged between the moveable claw and the immoveable claw, the externally disposed moveable planar rail being rigidly connected to the first moveable web and the moveable claw so as to be moveable together with the first moveable web and the moveable claw;
   wherein the moveable claw is translationally moveable relative to the immoveable claw;
   wherein the immoveable claw and the moveable claw are formed in one piece with connecting spring structures; and
   wherein the connecting spring structures include a first plurality of meandering-type spring elements and a second plurality of meandering-type spring elements, the first plurality of meandering-type spring elements directly connecting the first moveable web to the immoveable claw, and the second plurality of meandering-type spring elements being arranged at the moveable claw.

2. The mounting and latching mechanism as claimed in claim 1, wherein the immoveable claw, the moveable claw and the connecting spring structures comprise elements of a plastic injection-molded part.

3. The mounting and latching mechanism as claimed in claim 2, wherein the immoveable claw includes two hook-type appendages, which are mountable in an upper edge of the standard rail; and wherein the moveable claw includes at least one hook-type appendage, which is engageable with a lower edge of the standard rail.

4. The mounting and latching mechanism as claimed in claim 1, wherein the immoveable claw includes two hook-type appendages, which are mountable in an upper edge of the standard rail; and wherein the moveable claw includes at least one hook-type appendage, which is engageable with a lower edge of the standard rail.

5. The mounting and latching mechanism as claimed in claim 1, further comprising:
   an actuation element rigidly connected to the moveable claw.

6. The mounting and latching mechanism as claimed in claim 5, further comprising:
   a guidance, the actuation element being guided in the guidance in parallel with a direction of motion of the moveable claw.

7. The mounting and latching mechanism as claimed in claim 6, wherein the actuation element is guided along a direction parallel to the immoveable claw to protrude therebeyond.

8. The mounting and latching mechanism as claimed in claim 5, wherein the actuation element is guided along a direction parallel to the immoveable claw to protrude therebeyond.

9. The mounting and latching mechanism as claimed in claim 1, wherein the at least one moveable web further includes a second moveable web arranged adjacent to at least one immoveable web; wherein the immoveable claw is connected to the at least one immoveable web and the moveable claw is connected to the second moveable web; and wherein the second moveable web is connected to the at least one immoveable web by the second plurality of meandering-type spring elements.

10. The mounting and latching mechanism as claimed in claim 9, wherein the second moveable web is arranged centrally between two immoveable webs of the at least one immoveable web.

\* \* \* \* \*